US012585068B2

(12) United States Patent
Zhao et al.

(10) Patent No.: US 12,585,068 B2
(45) Date of Patent: Mar. 24, 2026

(54) PHOTOELECTRIC CONNECTOR AND PHOTOELECTRIC ADAPTER

(71) Applicant: WUHAN TELECOMMUNICATION DEVICES CO., LTD., Wuhan (CN)

(72) Inventors: Xiaobo Zhao, Wuhan City (CN); Huipeng Wu, Wuhan City (CN); Yong Luo, Wuhan City (CN); Benqing Quan, Wuhan City (CN); Beili Song, Wuhan City (CN)

(73) Assignee: WUHAN TELECOMMUNICATION DEVICES CO., LTD., Wuhan City (CN)

( * ) Notice: Subject to any disclaimer, the term of this patent is extended or adjusted under 35 U.S.C. 154(b) by 304 days.

(21) Appl. No.: 18/272,996

(22) PCT Filed: Sep. 1, 2021

(86) PCT No.: PCT/CN2021/115927
§ 371 (c)(1),
(2) Date: Jul. 18, 2023

(87) PCT Pub. No.: WO2022/156222
PCT Pub. Date: Jul. 28, 2022

(65) Prior Publication Data
US 2024/0077683 A1 Mar. 7, 2024

(30) Foreign Application Priority Data

Jan. 19, 2021 (CN) ......................... 202110071389.9

(51) Int. Cl.
*G02B 6/38* (2006.01)
(52) U.S. Cl.
CPC ......... *G02B 6/3817* (2013.01); *G02B 6/3825* (2013.01); *G02B 6/3877* (2013.01)

(58) Field of Classification Search
CPC ........................... G02B 6/3817; G02B 6/3877
See application file for complete search history.

(56) References Cited

U.S. PATENT DOCUMENTS

| | | | |
|---|---|---|---|
| 2018/0024302 A1 | 1/2018 | Gurreri | |
| 2018/0031775 A1* | 2/2018 | Gurreri | ............... G02B 6/3821 |
| 2022/0317384 A1 | 10/2022 | Qi | |

FOREIGN PATENT DOCUMENTS

| | | |
|---|---|---|
| CN | 111106469 A | 5/2020 |
| CN | 112764174 A | 5/2021 |

(Continued)

OTHER PUBLICATIONS

English translation of the Abstract_DE3112078A1.

(Continued)

*Primary Examiner* — Sung H Pak
(74) *Attorney, Agent, or Firm* — RADLO & SU; Pete Su

(57) ABSTRACT

A photoelectric connector and a photoelectric adapter. The photoelectric connector includes: a housing assembly including a front-rear run-through receiving space; a light guide assembly including a tail handle, an insert core, and an optical fiber, the insert core being disposed on one end of the tail handle, the tail handle being disposed in the receiving space, and the optical fiber being sequentially threaded into the tail handle and the insert core; and a conductive assembly including at least one conductive pin and a cable connected to the conductive pin; the conductive pin and the insert core being located on the same side of the receiving space; and the conductive pin being disposed on the tail handle. The photoelectric connector and the photoelectric adapter may simplify a plugging operation.

15 Claims, 9 Drawing Sheets

(56)            References Cited

FOREIGN PATENT DOCUMENTS

| CN | 112882162 | A | 6/2021 |
|----|-----------|---|--------|
| CN | 112882163 | A | 6/2021 |
| DE | 10331780  |   | 3/2005 |
| WO | WO 2012163983 | | 6/2012 |

OTHER PUBLICATIONS

English translation of the Abstract of CN112764174A.
English translation of the Abstract CN112882162A.
English translation of the Abstract CN112882163A.
English translation of the Abstract CN202256774U.

* cited by examiner

A–A

A-A

PHOTOELECTRIC CONNECTOR AND PHOTOELECTRIC ADAPTER

CROSS REFERENCE TO RELATED APPLICATIONS

This application is a U.S. National Phase entry of International Application No. PCT/CN2021/115927, filed on Sep. 1, 2021 which claims priority of Chinese Patent Application No. CN202110071389.9, filed on Jan. 19, 2021, the entire disclosures of which are incorporated by reference herein in their entireties.

FIELD OF THE INVENTION

The present disclosure relates to the technical field of optical communications, and in particular, to a photoelectric connector and a photoelectric adapter.

BACKGROUND OF THE INVENTION

The method of optical fiber communication is a way of communication that uses a light wave as an information carrier and an optical fiber as a transmission medium. In the technical field of optical communications, it relates to devices such as connectors, optical modules, adapters and the like.

Connectors are optical passive devices realizing the connection between optical fibers, which have the function of active connection between optical fibers and optical fibers, optical fibers and active devices, optical fibers and other passive devices, and optical fibers and instruments. Optical modules are very important optical signal interface devices in optical fiber communication, and are provided with an optical interface and an electrical interface, wherein the optical interface is connected with the optical fiber to transmit an optical signal, and the electrical interface is connected with an external communication terminal device. adapters are used to switch two connectors.

In the prior art, there are a large number of plug-in photoelectric circuits in a device represented by a 5G base station, and due to the separately optical and electrical setting, there are a large number of connectors which are divided into two types: optical and electrical, which need to be paired with each other, that results in a cumbersome operation during installation and maintenance, and a plug-in error easily occurring.

SUMMARY OF THE INVENTION

In view of this, the embodiments of this disclosure expect to provide a photoelectric connector and a photoelectric adapter to solve the problem of cumbersome operations.

In order to implement the above purpose, the technical solutions of the embodiments of this disclosure are implemented as follows.

A photoelectric connector comprises a housing assembly including a front-rear run-through receiving space; a light guide assembly including a tail handle, an insert core, and an optical fiber, wherein the insert core is disposed on one end of the tail handle, the tail handle is disposed in the receiving space, and the optical fiber is sequentially threaded into the tail handle and the insert core; and a conductive assembly including at least one conductive pin and a cable connected with the conductive pin, wherein the conductive pin and the insert core are located on the same side of the receiving space, and the conductive pin is disposed on the tail handle.

Furthermore, the conductive pin at least partially extends out of the receiving space.

Furthermore, the housing assembly comprises a housing, a rear sleeve and a tail sleeve, wherein the housing is nested with the rear sleeve to form the front-rear run-through receiving space, and the tail sleeve is nested at the end of the rear sleeve away from the housing.

Furthermore, the tail handle comprises a handle body and a projection protruding outwards along a radial direction of the handle body, wherein the projection is provided with a first through hole, and one end of the conductive pin is inserted into the first through hole.

Furthermore, a wall face of the receiving space is formed with an avoidance groove for avoiding the conductive pin.

Furthermore, the housing includes a housing body having a first via hole, and a side wall of the housing body is formed with a first channel; the rear sleeve is a sleeve having a second via hole; the housing body is nested with the rear sleeve, and the first via hole is connected with the second via hole to form the receiving space; the tail sleeve is a sleeve with a third via hole, and the side wall of the tail sleeve is formed with a second channel; and one end of the cable passes through the third via hole from one side of the tail sleeve away from the rear sleeve, then through the second channel to an outside of the tail sleeve, and then through the first channel into the receiving space to be connected with the conductive pin.

Furthermore, the first channel is a through hole or an open slot; and/or the second channel is a through hole or an open slot.

A photoelectric adapter, which is matched with the photoelectric connector described above, includes a body, a support portion, a sleeve member, and a conductive portion. The body is formed with at least one axial through channel. The supporting portion is supported in the channel and divides the channel into two sub-channels, and the two sub-channels are respectively in plug-in fit with the housing assembly of the corresponding photoelectric connector. The sleeve member is hollow and is disposed along the axial direction of the channel. The sleeve member is disposed on the support portion and connected with the two sub-channels. Two ends of the sleeve member are respectively in plug-in fit with the insert core of the corresponding photoelectric connector. The conductive portion is disposed on the support portion, and is configured to electrically connect the conductive pins of two photoelectric connectors.

Furthermore, the conductive portion is an axial through hole. The two ends of the conductive portion are configured to be inserted respectively the conductive pins of the two photoelectric connectors so that the conductive pins abut against each other to implement electrical connection.

Furthermore, the conductive portion includes an axial through guide hole and a conductive body disposed in the guide hole. Two sides of the conductive body are electrically connected with the conductive pins of the two photoelectric connectors, respectively.

Furthermore, the conductive body is a sleeve with an opening at one end plugged with the conductive pin of one photoelectric connector. One closed end of the conductive body abuts against the conductive pin of another photoelectric connector.

Furthermore, two end faces of the electric conductor abut against the conductive pins of each of the photoelectric connectors, respectively.

According to the embodiments of the disclosure, a photoelectric connector and a photoelectric adapter is provided with a housing assembly, a light guide assembly including an insert core, and a conductive assembly including at least one conductive pin disposed on a tail handle and a cable connected with the conductive pin, wherein the conductive pin and the insert core are located on the same side of the receiving space, so that the conductive pin and the insert core share one plug-in component on the same side, and the establishment of the photoelectric channel may be completed by one plugging, thereby simplifying the plugging operation, avoiding the unsmooth photoelectric channel caused by misoperation, and effectively implementing photoelectric transmission.

DETAILED DESCRIPTION OF THE PREFERRED EMBODIMENT

It should be noted that, in the absence of conflicts, embodiments of the present disclosure and the technical features in the embodiments may be combined with each other, and the detailed description in the specific implementation should be understood as the explanation of the present disclosure, and should not be regarded as an improper limitation to the present disclosure.

Figure 1:
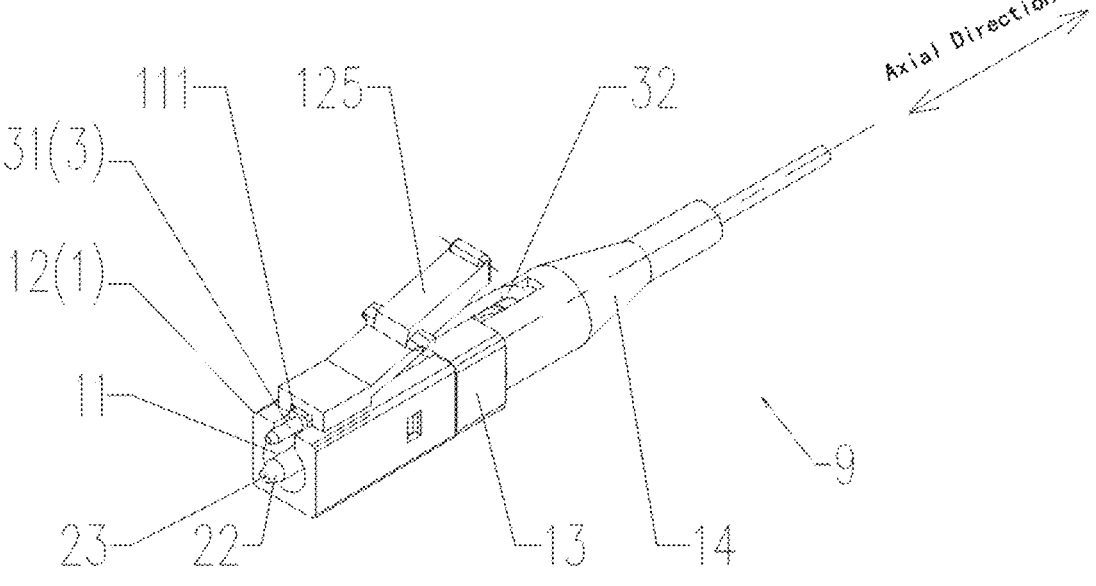
FIG. 1 is a three-dimensional view of a photoelectric connector according to an embodiment of the present disclosure.
Figure 2:
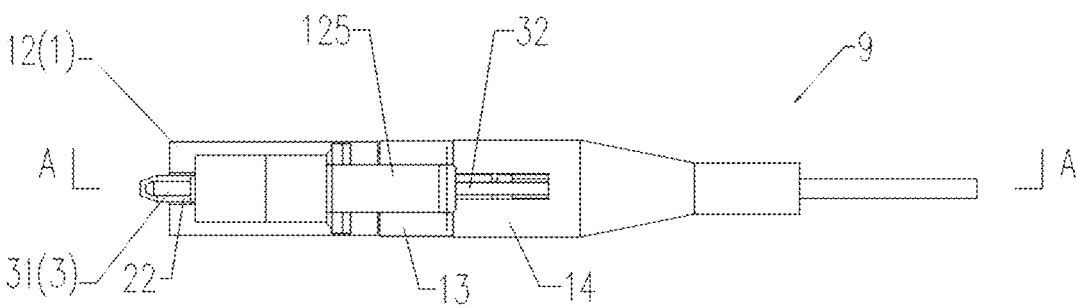
FIG. 2 is a top view of FIG. 1.
Figure 3:
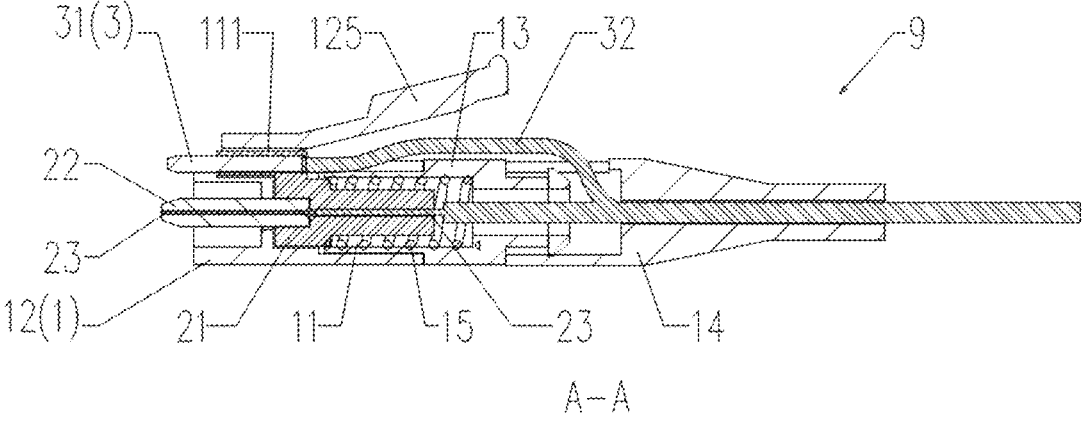
FIG. 3 is an A-A sectional view of FIG. 2.
Figure 4:
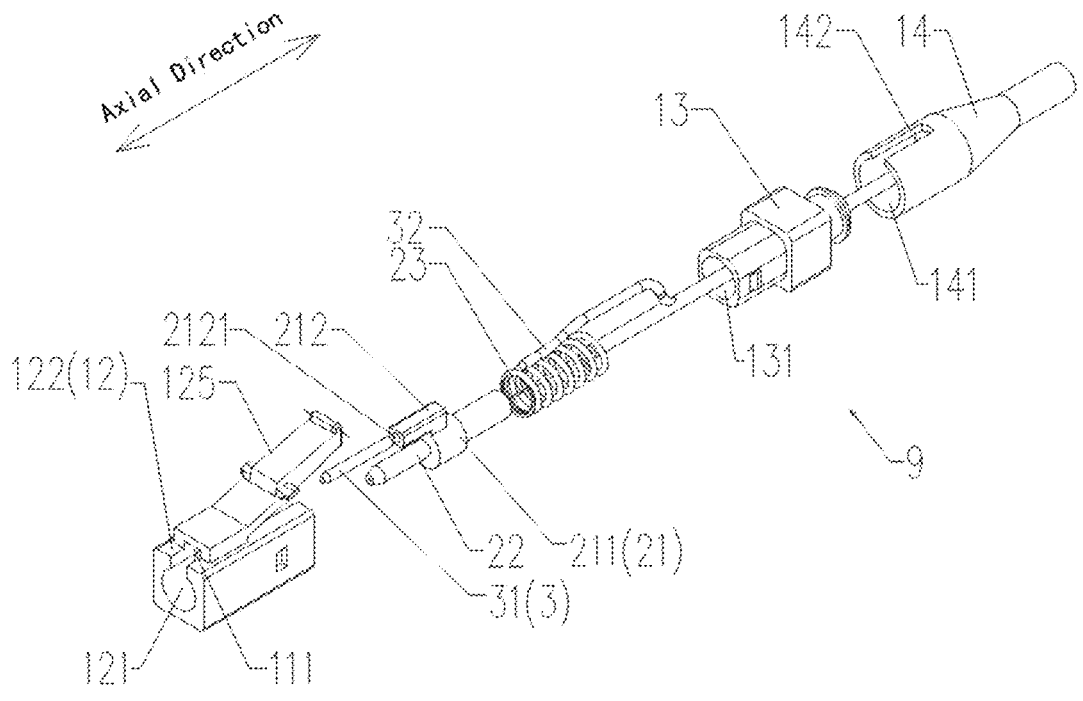
FIG. 4 is an exploded view of the photoelectric connector of FIG. 1 in one view.
Figure 5:
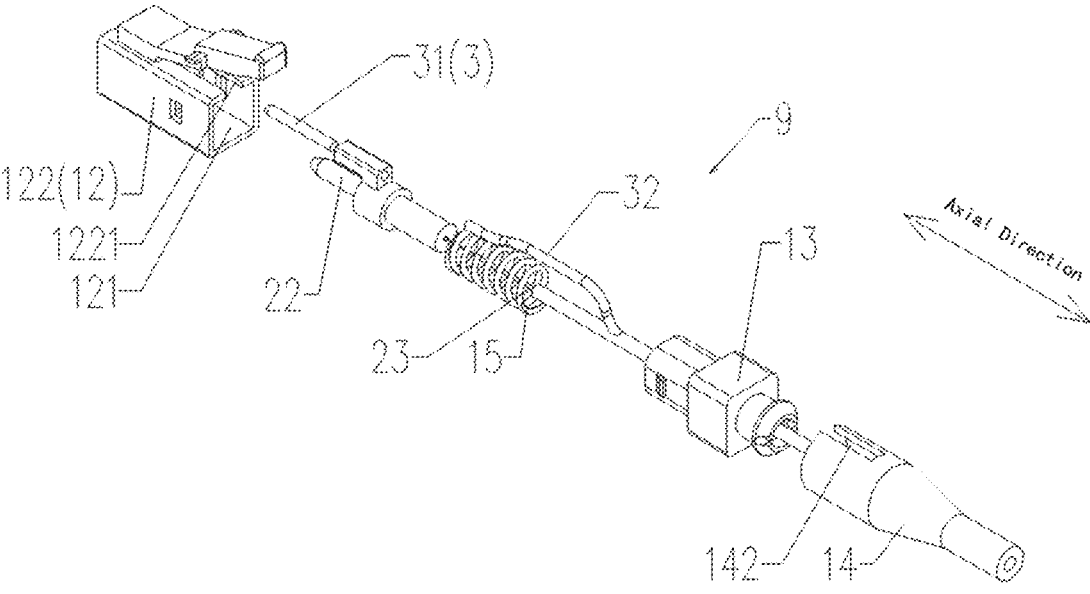
FIG. 5 is an exploded view of the photoelectric connector of FIG. 1 in another view.

In the description of the embodiments of the present disclosure, the "up", "down", "left", "right", "front", and "rear" orientation or positional relationship are based on the orientation or positional relationship shown in FIG. 1, wherein the "front" refers to the direction close to the insert core 23 along the axial direction, and the "rear" refers to the direction away from the insert core 23 along the axial direction. It should be understood that these orientation terms are only for the convenience of describing the present disclosure and simplifying the description, rather than indicating or imply that the apparatus or element referred to must have a particular orientation, be constructed and operate in a particular orientation, and therefore it should not be construed as a limitation of the present disclosure.

As shown in FIG. 1 to FIG. 21, a photoelectric connector includes a housing assembly 1, a light guide assembly 2, and a conductive assembly 3.

The housing assembly 1 includes a front-rear run-through receiving space 11 for receiving other components. The outside of the housing assembly 1 may be plugged-in fit with the optical module, the photoelectric adapter, and the like.

The light guide assembly 2 includes a tail handle 21, an insert core 22, and an optical fiber 23. The optical fiber 23 includes a plastic outer layer (not shown), a cladding layer (not shown), and a fiber core disposed in the cladding layer. The fiber core may be a glass fiber core for transmitting an optical signal, and the plastic outer layer is used to provide protection.

The insert core 22 is disposed on one end of the tail handle 21, and the optical fiber 23 sequentially passes through the tail handle 21 and the insert core 22 until the fiber core is flush with the end of the insert core 22 away from the tail handle 21. The optical signal is transmitted in the fiber core until reaching one end surface of the insert core 22, and then the transmission of the optical signal is completed by means of a component that is optically butt-coupled to the insert core 22. The component herein may be an insert core 22 of another photoelectric connector, or may be an optical socket of an optical module. The receiving space 11 may be provided with a corresponding groove, and a stop block to match with the tail handle 21 to complete axial limit, so that the tail handle 21 is disposed in the receiving space 11.

The conductive assembly 3 includes at least one conductive pin 31 and a cable 32 connected to the conductive pin 31. The conductive pin 31 and the insert core 22 are located on the same side of the receiving space 11, so that the conductive pin 31 and the insert core 22 share one plug-in component at the same side. The establishment of the photoelectric channel may be completed by one plugging, which may simplify the plug-in operation, and may also avoid misoperations that cause the photoelectric channel to be unsmooth, and effectively realize the transmission of photoelectricity. The number of the conductive pins 31 may be one, two, or three or more according to the requirements of the structure function.

In various embodiments of the present disclosure, the conductive pin 31 and the cable 32 may be directly connected to form an electrical transmission channel. The conductive pin 31 and the cable 32 may also be connected by a section of metal cylinder which has a transition connection effect, so as to prevent the conductive pin 31 from being disconnected from the cable 32.

The conductive pins 31 may partially extend out of the receiving space 11. Specifically, as shown in FIG. 1 to FIG.

5, one end of the conductive pin 31 connected to the cable 32 is fixed in the receiving space 11, and one end of the conductive pin 31 away from the cable 32 extends along the axial direction until protruding out of the receiving space 11, so as to complete electrical transmission with the electrically coupled component. As shown in FIG. 6 to FIG. 11, the conductive pin 31 may also be fixed to the outside of the housing assembly 1, so that the conductive pin 31 is integrally located outside the receiving space 11, and one end of the conductive pin 31 away from the cable 32 extends forward along the axial direction until crossing the front end of the housing assembly 1 to form a protrusion which completes electrical transmission with the electrically coupled component. The component herein may be a conductive pin 31 of another photoelectric connector, or may be an electrical socket of an optical module, or may be an electrical connector on a 5G terminal device.

The conductive pin 31 and the cable 32 form an electrical transmission channel to implement electrical transmission. The electricity herein may be the electric power supplied to the terminal device, or may be an electrical signal carrying customer service data.

Taking the transmission of an electrical signal as an example, in the prior art, an optical communication device includes one or more types of single boards to complete functions such as processing, transmission and exchange of customer service data. The optical module is one of the important components of the optical communication device, and is used to implement that the client service data carries the optical signal for sending and/or parsing the client service data from the optical signal. Correspondingly, the optical module has an optical socket and an electrical socket to receive/transmit the optical signals and the electrical signals respectively. In this embodiment of the disclosure, the conductive pin 31 is electrically connected to the electrical socket 43 (mentioned below) of the optical module to establish a channel for transmitting the electrical signal. The optical socket 42 (mentioned below) of the optical module is optically coupled to the optical fiber 23 in the insert core 22 of the light guide assembly 2 to establish a channel for transmitting the optical signal. The optical signal sent from the outside enters the optical socket 42 of the optical module via the optical fiber 23. The optical module processes the optical signal to convert the optical signal into an electrical signal. The electrical signal is transmitted to the terminal device through the electrical socket 43. The process may also be implemented in reverse. The electrical signal sent by the terminal device is transmitted to the electrical socket 43 of the optical module via the conductive pin 31. The optical module processes the electrical signal to convert the electrical signal into an optical signal. The optical signal is transmitted to the optical fiber 23 in the insert core 22 of the light guide assembly 2 through the optical socket 42 and then transmitted to the terminal device at the other end. Thereby, the process of reception, conversion and transmission of the optical signal and the electrical signal is completed.

Taking the electric power supplied to terminal equipment as an example, in the prior art, the operation of the optical communication device itself requires power supply, especially in a 5G application, many corresponding optical connectors and electrical connectors for supplying the terminal device, wherein the terminal device may be an AP (Access Point), an indoor antenna, a camera, a PC (Personal Computer) end, etc. In this embodiment of the disclosure, the conductive pin 31 is electrically connected to the electrical socket 43. The electrical power received by the cable 32 is transmitted to the electrical socket 43 through the conductive pin 31. The optical module transmits the electrical power to the terminal device for the operation of the terminal device. The optical fiber 23 in the insert core 22 of the light guide assembly 2 is optical coupling with the optical socket 42 to establish a channel for transmitting the optical signal. The electrical signal sent by the terminal device is transmitted to the optical module. The optical module converts the electrical signal into an optical signal. The optical signal enters the optical fiber 23 through the optical socket 42 to implement transmission. The process of reception, conversion and transmission of corresponding optical signal is completed.

In a possible embodiment, as shown in FIG. 1 to FIG. 11, the housing assembly 1 includes a housing 12, a rear sleeve 13, and a tail sleeve 14. The housing 12 includes a housing body 122 having a first via hole 121. The rear sleeve 13 is a sleeve having a second via hole 131. The tail sleeve 14 is a sleeve having a third via hole 141.

The housing 12 and the rear sleeve 13 are nested to form a receiving space 11 that runs through from the front to the rear; that is, the housing body 122 is nested with the rear sleeve 13, and the first via hole 121 is connected through to the second through-hole 131 to form the receiving space 11 for receiving the light guide assembly 2. The tail sleeve 14 is nested at one end of the rear sleeve 13 away from the housing 12.

The optical fiber 23 passes through the third via hole 141 into the receiving space 11. The optical fiber 23, with the plastic outer layer removed, is then sequentially passed through and disposed between the tail handle 21 and the insert core 22 until that the fiber core is flush with one end of the insert core 22 away from the tail handle 21.

It may be understood that the design of the structure is various, so that each component of the light guide assembly 2 are not necessarily all in the receiving space 11, and only the tail handle 21 needs to be fixed in the receiving space 11; for example, corresponding positioning grooves and positioning blocks may be provided in the housing body 122 and the rear sleeve 13 to match with the tail handle 21, so as to implement axial limiting, so that the tail handle 21 is disposed in the receiving space 11; and the remaining components are directly or indirectly fixed to the tail handle 21.

One end of the insert core 22 away from the tail handle 21 protrudes from the receiving space 11. The insert core 22 protrudes from one end of the housing body 122 away from the rear sleeve 13, so that one end of the insert core 22 away from the tail handle 21 is inserted into the corresponding component.

The component herein refers to the optical socket of the optical module, and the sleeve member 53 of the photoelectric adapter (mentioned below).

Taking the component as the sleeve member 53 as an example, the insert cores 22 of the light guide assemblies 2 of the two photoelectric connectors 9 may be respectively inserted from two sides of the sleeve member 53 to implement optical butt-coupling. The sleeve member 53 may provide functions such as sealing, protection, and guidance.

In a possible embodiment, as shown in FIG. 1 to FIG. 5, the conductive pin 31 is disposed on the tail handle 21 to be fixed. The cable 32 passes through the tail handle 21 to connect with the conductive pin 31 to form an electrical transmission channel to implement electrical transmission.

In a possible embodiment, as shown in FIGS. 1 to 5, the tail handle 21 includes a handle body 211 and a projection 212 protruding radially outward along the handle body 211.

The handle body 211 may be a plastic member or a ceramic member. The projection 212 may be an insulating plastic member. The projection 212 is formed with a first through hole 2121 along the axial direction of the handle body 211. One end of the conductive pin 31 is inserted into the first through hole 2121 to implement fixation of the conductive pin 31. The cable 32 may extend into the first through hole 2121 to be connected with the conductive pin 31, so as to implement electrical insulation and avoid electrical leakage. The projection 212 and the handle body 211 may be integrally machined for good connection strength. Alternatively, the projection 212 and the handle body 211 may be manufactured respectively, and then are fixed by bonding, clamping or welding.

In a possible embodiment, as shown in FIG. 1 to FIG. 5, the wall surface of the receiving space 11 is formed with an avoidance groove 111 that avoids the conductive pins 31. Specifically, the avoidance groove 111 may be formed by recessing the housing 12, or may be formed by perforation of the rear sleeve 13, as long as it may be prevented interfering with the conductive pin 31.

In a possible embodiment, as shown in FIGS. 1 to 5, a side wall of the housing body 122 is formed with a first channel 1221 that connects with the external environment and the first via hole 121. A side wall of the tail sleeve 14 is formed with a second passage 142 that connects the external environment and a third via hole 141.

One end of the cable 32 passes through the third via hole 141 from one side of the tail sleeve 14 away from the rear sleeve 13, then through the second channel 142 to the outside of the tail sleeve 14, and then through the first channel 1221 into the receiving space 11 to be connected with the conductive pin 31. It is ensured that the cable 32 is connected with the conductive pin 31 to form an electrical transmission channel to implement electrical transmission, and the appearance structure of the photoelectric connector remains unchanged, so as to be common to commercially available products.

In order to simplify the structure, the cable 32 and the optical fiber 23 may be combined into one strand when passing through the third via hole 141, and the cable 32 and the optical fiber 23 are separated into two strands when the cable 32 passes through the second channel 142. The cable 32 is arranged according to the above route, and the optical fiber 23 sequentially passes through the tail handle 21 and the insert core assembly.

In a possible embodiment, the first channel 1221 may be a through hole, the second channel 142 may be a through hole, and the diameter of the through hole should be slightly larger than the diameter of the cable 32, so as to facilitate the cable 32 to pass therethrough.

As shown in FIG. 1 to FIG. 5, the first channel 1221 may be an open slot which extends to the edge of one side wall of the housing body 122 close to one side of the rear housing 13 and is formed with an opening at the edge of one side wall. That is, the first channel 1221 runs through the edge of one side wall of the housing body 122 close to one side of the rear housing 13, so that the first channel 1221 has a long U-shaped opening, which facilitates the cable 32 to pass through the first channel 1221

Similarly, the second channel 142 may also be an open groove. The open groove extends to the edge of one side wall of the tail sleeve 14 close to one side of the rear housing 13 and is formed with an opening at the edge of one side wall. That is, the second channel 142 runs through the edge of one side wall of the tail sleeve 14 close to one side of the rear housing 13, so that the second channel 142 has a long U-shaped opening, which facilitate the cable 32 to pass through the second channel 142.

In a possible embodiment, as shown in FIG. 6 to FIG. 11, the conductive pin 31 is disposed on an outside of the housing assembly 1. Specifically, the conductive pin 31 may be disposed on one of the housing 12, the rear sleeve 13, or the tail sleeve 14, depending on the design, as long as it may be ensured that the conductive pin 31 is relatively fixed with the housing assembly 1. In this embodiment, the conductive pin 31 is disposed on the outside of the housing 12.

In a possible embodiment, as shown in FIG. 6 to FIG. 11, the conductive pin 31 is disposed on an outside surface of the housing body 122. A side wall of the tail sleeve 14 is formed with a second channel 142 connected with an external environment and a third via hole 141.

One end of the cable 32 passes through the third via hole 141 from one side of the tail sleeve 14 away from the rear sleeve 13, then through the second channel 142 to the outside of the tail sleeve 14 to be connected with the conductive pin 31. It is ensured that the cable 32 is connected with the conductive pin 31 to form an electrical transmission channel to implement electrical transmission, and the appearance structure of the photoelectric connector remains unchanged, so as to be common to commercially available products.

Similarly, in order to simplify the structure, the cable 32 and the optical fiber 23 may be combined into one strand when passing through the third via hole 141, and the cable 32 and the optical fiber 23 are separated into two strands when the cable 32 passes through the second channel 142. The cable 32 is arranged according to the above route, and the optical fiber 23 sequentially passes through the tail handle 21 and the insert core assembly.

Figures 6, 7:
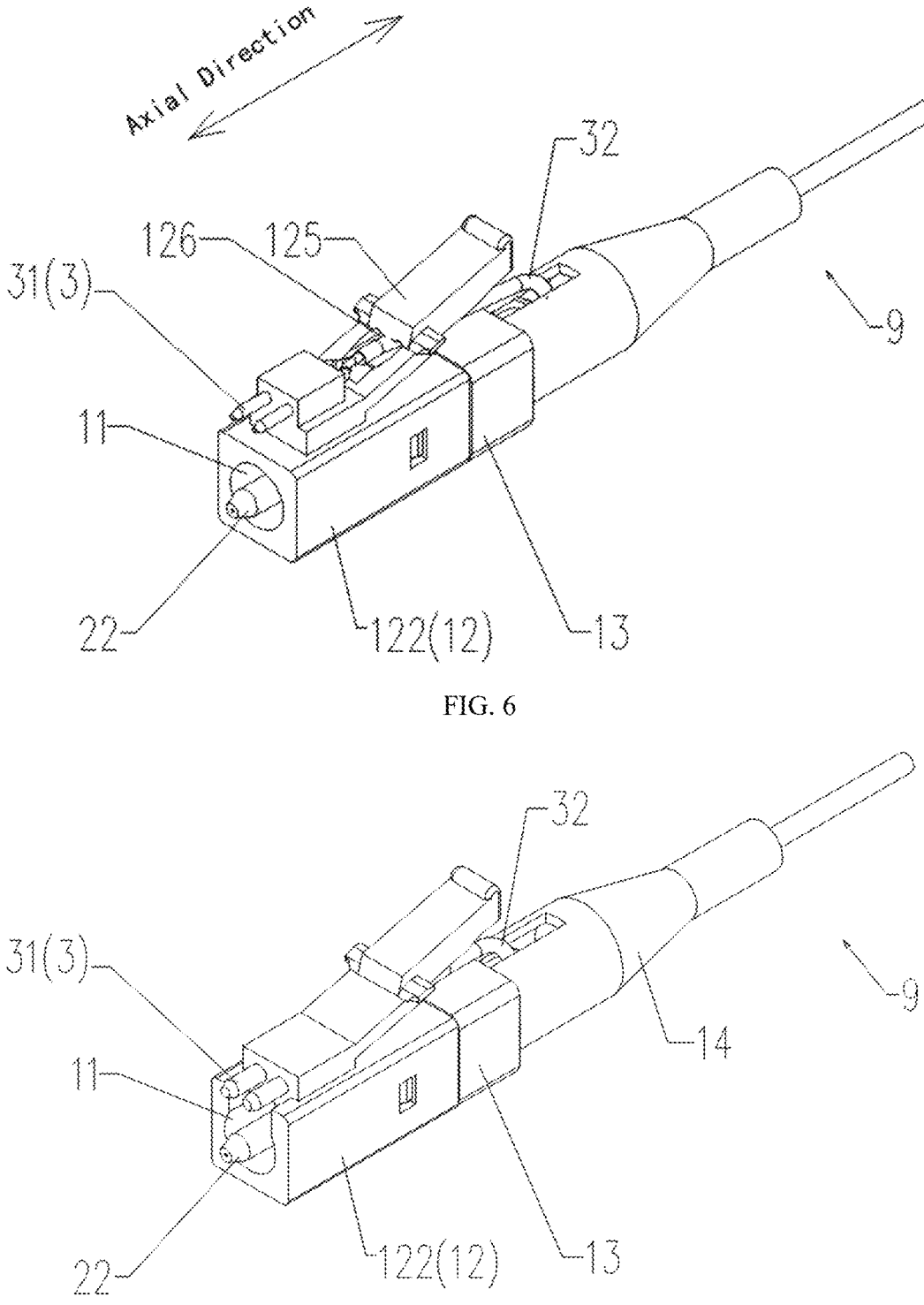
FIG. 6 is a three-dimensional view of a photoelectric connector according to another embodiment of the present disclosure.
FIG. 7 is a three-dimensional view of a photoelectric connector according to still another embodiment of the present disclosure.
Figure 8:
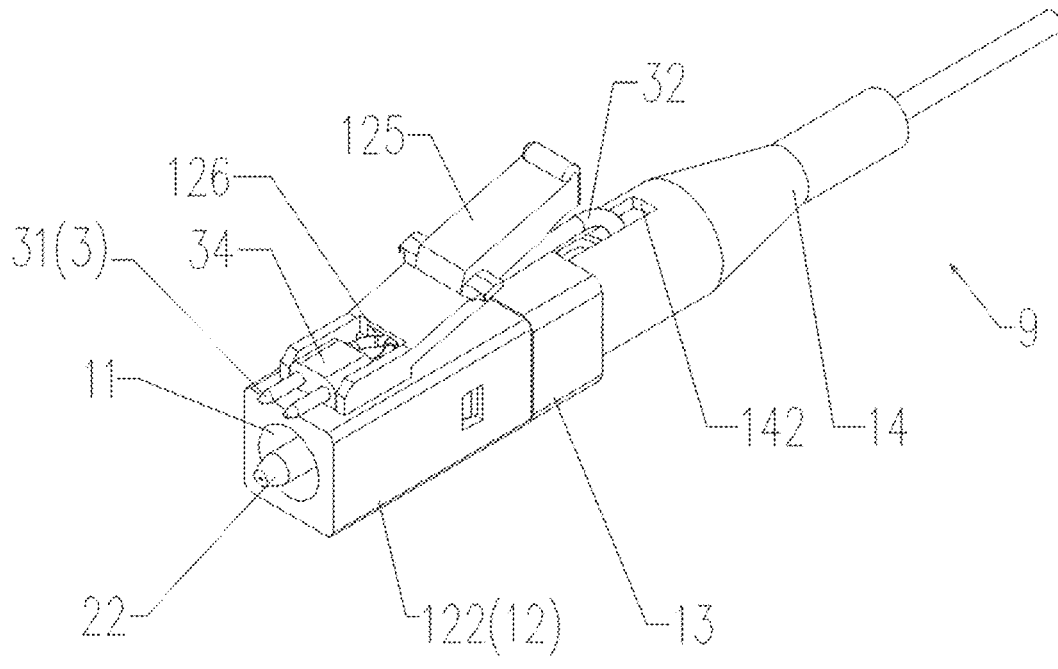
FIG. 8 is a three-dimensional view of a photoelectric connector according to yet another embodiment of the present disclosure.
Figure 9:
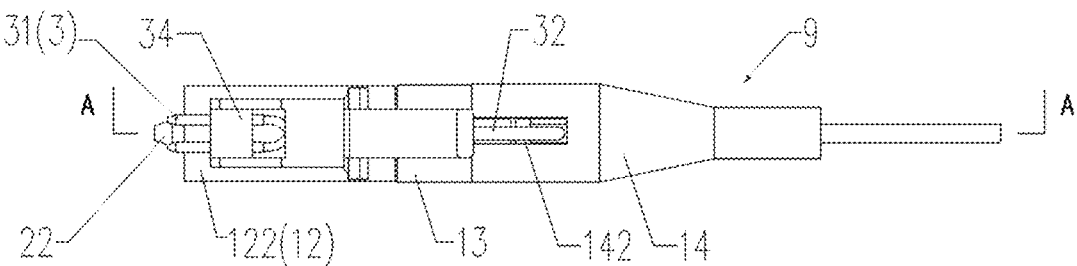
FIG. 9 is a top view of FIG. 8.
Figure 10:
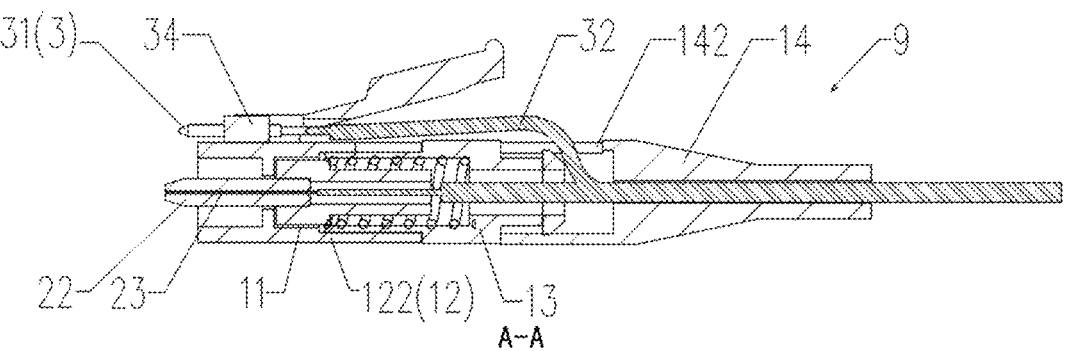
FIG. 10 is a section A-A of FIG. 9.
Figure 11:
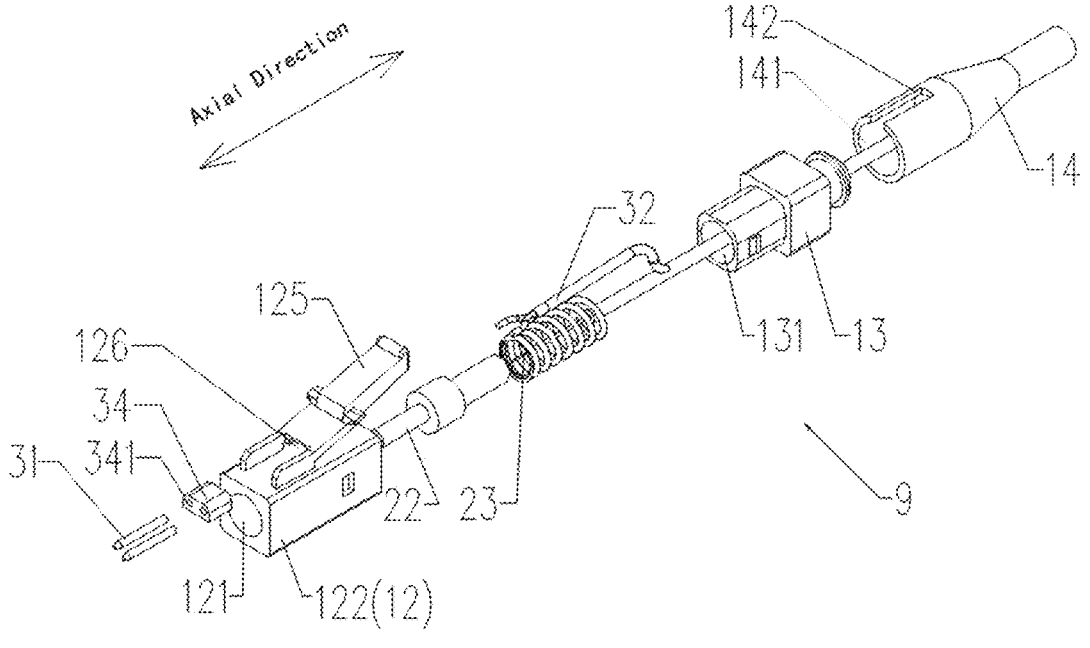
FIG. 11 is an exploded view of the photoelectric connector of FIG. 8 at a viewing angle.

As shown in FIG. 6 and FIG. 7, the conductive pin 31 may be directly inserted into one side wall of the housing body 122 with a simple structure and good strength at the connection, but this places high demands on the dimensional requirement, the insulation performance and the hardness of the housing body 122.

In a possible embodiment, as shown in FIG. 8 to FIG. 11, the conductive assembly 3 includes a fixing base 34 disposed on a side wall of the housing body 122. The housing body 122 may be an injection molding member, and the fixing base 34 may be an insulating plastic member or a rubber member; the fixing base 34 is formed with a second through hole 341 in the axial direction, and one end of the conductive pin 31 is inserted into the second through hole 341 to implement fixation of the conductive pin 31. The cable 32 may extend into the second through hole 341 to be connected with the conductive pin 31, so as to implement electrical insulation and avoid electrical leakage. The fixing base 34 and the housing body 122 may be manufactured respectively, and then are fixed by bonding, clamping, or welding, thereby reducing process difficulty and cost.

In a possible embodiment, as shown in FIG. 1 to FIG. 11, the housing 12 includes an elastic card plate 125 disposed on a side wall of the housing body 122. The component matching with the photoelectric connector may be provided with a respective axial limiting hole (not shown) to limit the axial displacement of the housing assembly 1. The component herein may be an optical module, or a photoelectric adapter.

The elastic card plate 125 is formed with a third channel 126 through which the cable 32 passes, so as to prevent the elastic card plate 125 from interfering with the cable 32. The third channel 126 may be a through hole. The diameter of the through hole should be slightly larger than the diameter of the cable 32, so as to facilitate the cable 32 to pass therethrough.

In a possible embodiment, as shown in FIG. 1 to FIG. 11, the housing assembly 1 includes an elastic member 15 that may be a spring. The elastic member 15 is disposed in the receiving space 11. One end of the elastic member 15 abuts against the rear sleeve 13, and the other end of the elastic member 15 abuts against the tail handle 21. The elastic member 15 provides a force to the insert core 22 through the tail handle 21. When the insert cores 22 of the conductive assemblies 3 of the two photoelectric connectors 9 are respectively inserted from two sides of the sleeve member 53, the elastic member 15 may change its length and volume so that the two insert cores 22 are not in hard contact, and the two insert cores 22 are docked tightly depending on the force of the elastic member 15 to complete optical butt-coupling. Similarly, the insert core 22 of the conductive assembly 3 of the photoelectric connector 9 is assembled with the optical socket 42 (mentioned below) of the optical module, and the two are tightly abutted depending on the force of the elastic member 15 to complete the optical butt-coupling.

The present disclosure further provides an optical module, which matches with the photoelectric connector 9 of the above embodiments. As shown in FIG. 1 to FIG. 12, the optical module includes an electrical board 41, an optical socket 42, and an electrical socket 43

The optical socket 42 and the electrical socket 43 are disposed at the same end of the electrical board 41, so that the conductive pin 31 of the photoelectric connector 9 and the insert core 22 are plugged at the same end of the optical module, thereby avoiding two separate plugging operation at the two ends of the optical module, simplifying the plugging operation, and avoiding the unsmooth photoelectric channel caused by the plugging error.

The optical socket 42 is plugged with the insert core 22 of the photoelectric hybrid connector 9, and the two are optically coupled with each other to establish a channel for transmitting optical signals. The electrical socket 43 is plugged with the corresponding conductive pin 31, and the two are electrically connected with each other. Those skilled in the art should know that the electrical board 41 is provided with electrical elements necessary to complete the functions of the optical module, which will not be repeated here.

Taking the electrical socket 43 as an example for transmitting an electrical signal, the optical signal sent from the outside enters the optical socket 42 of the optical module via the optical fiber 23 in the insert core 22. The optical module processes the optical signal to convert the optical signal into an electrical signal. The electrical signal is transmitted to the terminal device through the electrical socket 43. It is also possible to implement the process in reverse.

The electrical signal sent by the terminal device is transmitted to the electrical socket 43 of the optical module via the conductive pin 31. The optical module processes the electrical signal to convert the electrical signal into an optical signal. The optical signal is transmitted to the optical fiber 23 in the insert core 22 of the light guide assembly 2 through the optical socket 42 and then transmitted to the outside. Thereby, the process of reception, conversion and transmission of the optical signal and the electrical signal is completed.

Taking the electrical socket 43 as an example for supplying electric power to the terminal device, the conductive pin 31 is electrically connected with the electrical socket 43. The electrical power received by the cable 32 is transmitted to the electrical socket 43 through the conductive pin 31. The optical module transmits the electrical power to the terminal device for the operation of the terminal device. The optical fiber 23 in the insert core 22 of the light guide assembly 2 is optical coupling with the optical socket 42 to establish a channel for transmitting the optical signal. The electrical signal sent by the terminal device is transmitted to the optical module. The optical module converts the electrical signal into an optical signal. The optical signal enters the optical fiber 23 through the optical socket 42 to implement transmission. The process of reception, conversion and transmission of corresponding optical signal is completed.

Figure 12:
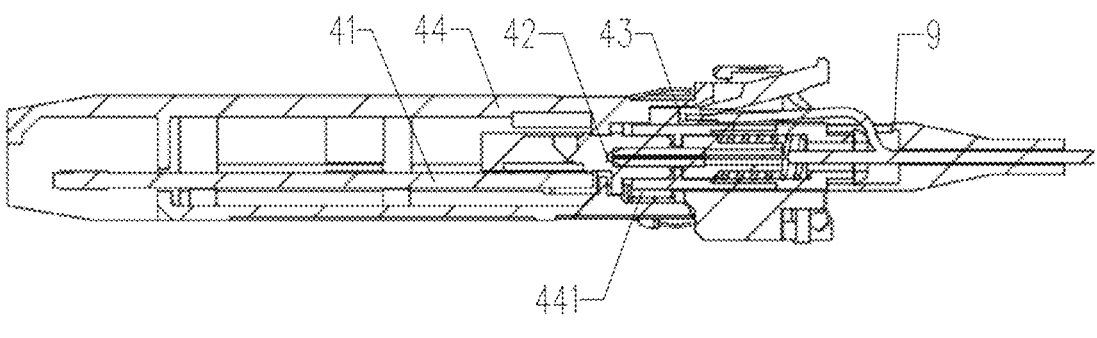
FIG. 12 is a schematic assembly diagram of an optical module and a photoelectric connector according to an embodiment of the present disclosure.
Figure 13:
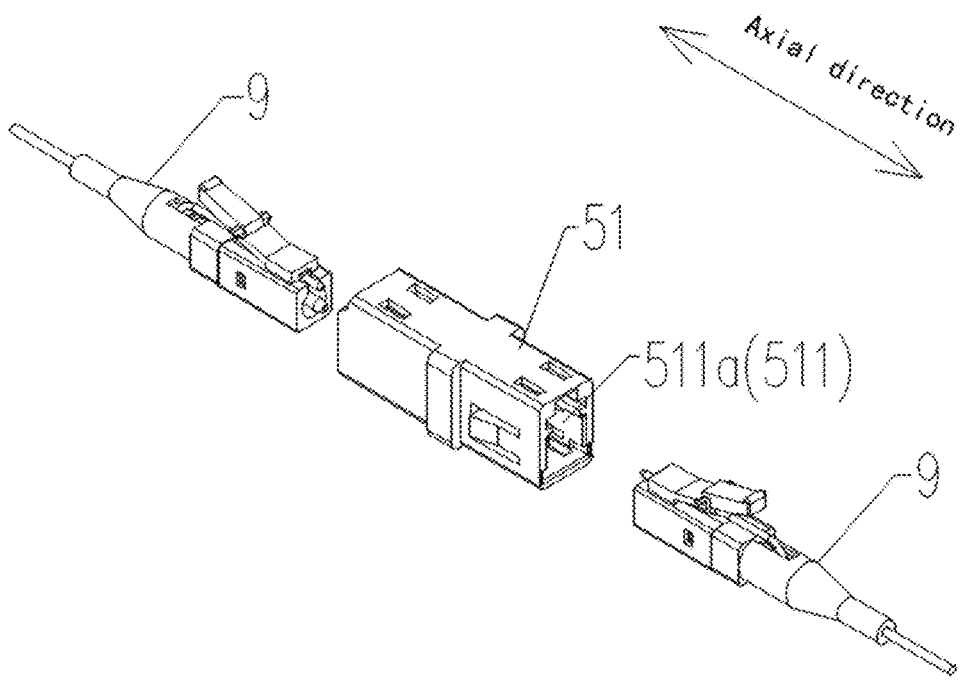
FIG. 13 is an exploded view of a photoelectric adapter and a photoelectric connector according to an embodiment of the present disclosure.

In a possible embodiment, as shown in FIG. 12, the optical module includes a module housing 44, which may provide functions such as fixing, protection, and dust prevention. The electrical board 41 is fixed inside the module housing 44. The end of the module housing 44 is formed with a mounting hole 441 for receiving the electrical socket 42 and the electrical socket 43. The mounting hole 441 is configured to be inserted with the housing assembly 1. Components such as positioning grooves, positioning baffles and the like may be correspondingly provided in the mounting hole 441, so that the housing assembly 1 is fixed axially and circumferentially in the mounting hole 441.

The present disclosure further provides a photoelectric adapter, which matches with the photoelectric connector 9 of any one of the above embodiments. As shown in FIG. 1 to FIG. 11, FIG. 13 to FIG. 19, the photoelectric adapter includes a body 51, a support portion 52, a sleeve member 53, and a conductive portion 54

The body 51 is formed with at least one axially-through channel 511. The support portion 52 is supported in the channel 511 and divides the channel 511 into two sub-channels 511a, and the two sub-channels 511a are respectively in plug-in fit with the housing assembly 1 of the corresponding photoelectric connector 9. The sleeve member 53 is hollow and disposed along the axial direction of the channel 511. The sleeve member 53 is disposed on the support portion 52 and connected to the two sub-channels 511a. Two ends of the sleeve member 53 are respectively in plug-in fit with the insert core 22 of the corresponding photoelectric connector 9. The sleeve member 53 provides functions such as sealing, protection, and guiding. The insert cores 22 of the two photoelectric connectors 9 are docked in the sleeve member 53. The optical fiber 23 on the end surface of the insert core 22 is optically coupled to establish a channel for transmitting the optical signal.

The body 51 may be injection-molded with a plastic member. The support portion 52 may be integrally injection-molded with plastic parts and the body 51. The sleeve member 53 may be a through channel formed on the support portion 52, and the two are integrally formed. In order to ensure the docking precision, the sleeve member 53 is made of ceramic separately and then implanted into the support portion 52, which may meet the precision requirements of use on one hand and reduce costs on the other hand.

The conductive portion 54 is disposed on the support portion 52. The conductive portion 54 is configured to electrically connect the conductive pins 31 of the two photoelectric connectors.

Figure 14:
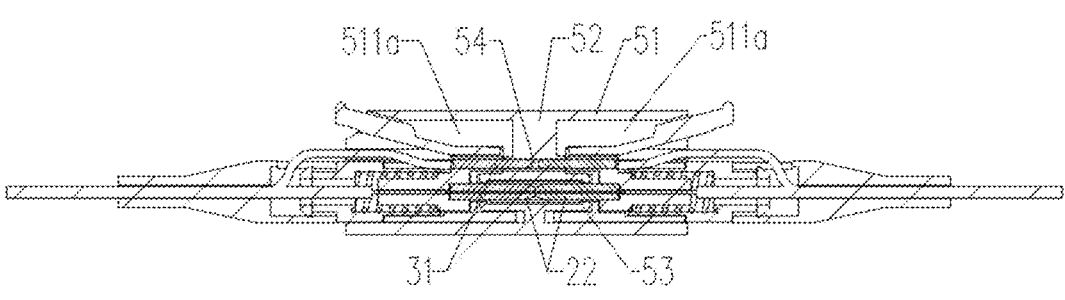
FIG. 14 is a schematic assembly diagram of the photoelectric adapter and the photoelectric connector of FIG. 13.
Figure 15:
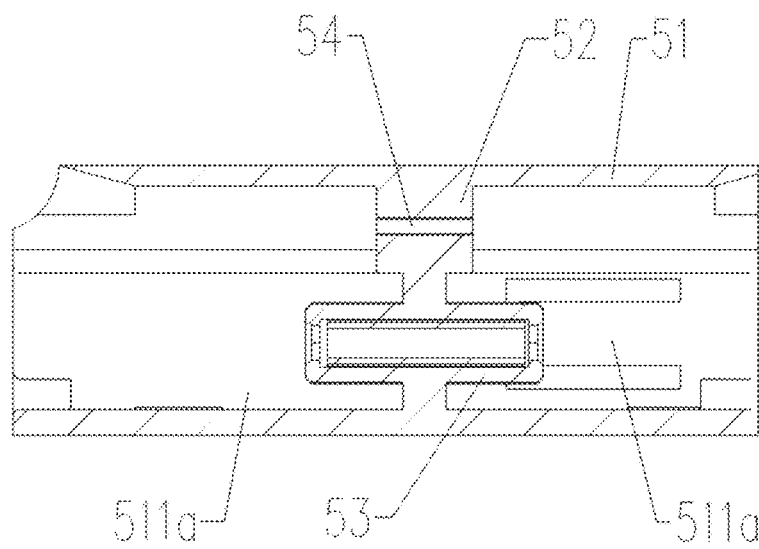
FIG. 15 is a schematic structural diagram of the photoelectric adapter of FIG. 13.
Figure 16:
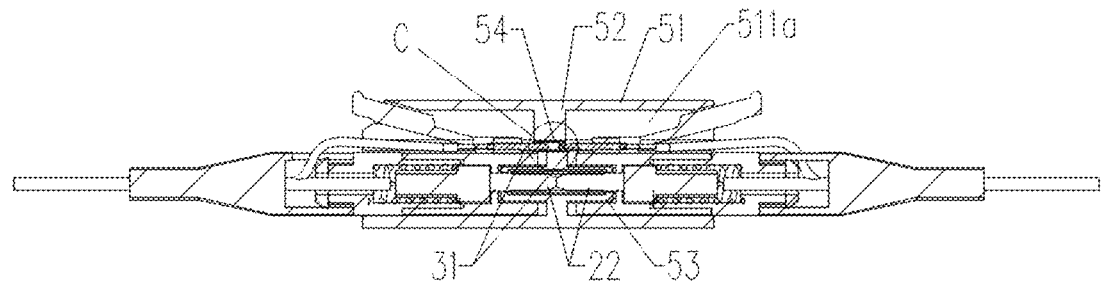
FIG. 16 is a schematic assembly diagram of a photoelectric adapter and a photoelectric connector according to an embodiment of the present disclosure.
Figure 17:
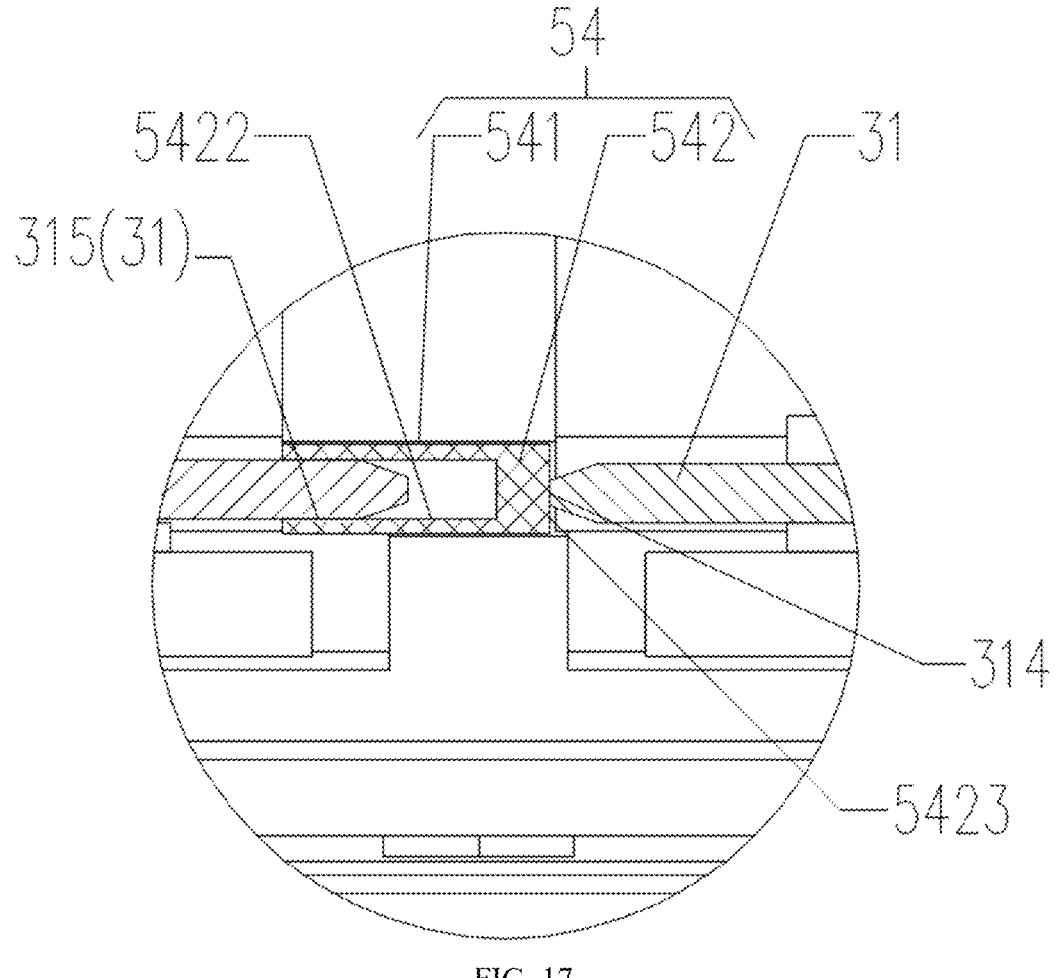
FIG. 17 is an embodiment of the C partial enlarged view of FIG. 16.
Figure 18:
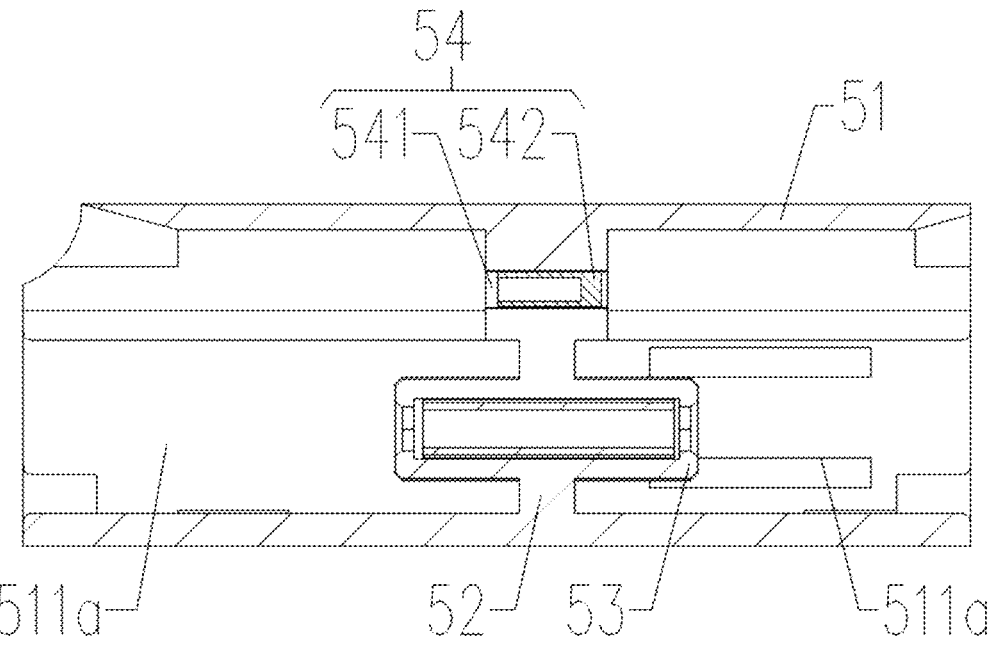
FIG. 18 is a schematic structural diagram of the photoelectric adapter of FIG. 16.

In a possible embodiment, as shown in FIG. 14 and FIG. 15, the conductive portion 54 may be a barrel made of a conductive material. Two ends of the conductive portion 54 are configured to be electrically connected with the conductive pins 31 of the two photoelectric connectors, respectively, so that the conductive pins 31 of the two photoelectric connectors are electrically connected. At this time, the conductive portion 54 plays the role of guiding and conducting.

It may be understood that since the conductive portion 54 itself conducts electricity, the conductive pins 31 of the two photoelectric connectors may not be in contact with each other. Therefore, by designing the lengths of the conductive pin 31 and the conductive portion 54, hard contact will not occur when the conductive pin 31 is inserted into the bottom, and at this time, the conductive pin 31 may be a single metal rod.

In a possible embodiment, as shown in FIG. 14 and FIG. 15, the conductive portion 54 is an axial through hole made of an insulating material. For example, the conductive portion 54, the supporting portion 52 and the body 51 are all made of plastic and integrally formed. Two ends of the conductive portion 54 are configured for insertion of the conductive pins 31 of the two photoelectric connectors respectively so that they abut against each other to implement electrical connection.

In a possible embodiment, as shown in FIG. 16 to FIG. 19 and FIG. 21, the conductive portion 54 includes an axial through guide hole 541 and a conductive body 542 disposed in the guide hole 541. Two sides of the conductive body 542 are electrically connected with the conductive pins 31 of the two photoelectric connectors, respectively. The conductor 542 is a metal conductor, and is made of a material having good conductivity such as brass and aluminum, so as to facilitate electrical connection.

Figure 19:
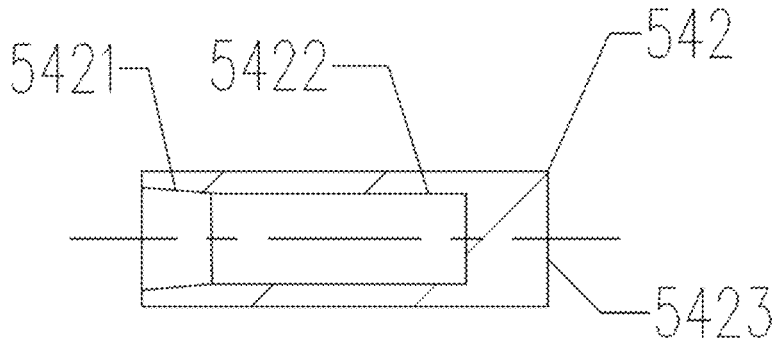
FIG. 19 is a schematic structural diagram of a conductive body according to an embodiment of the disclosure.

As shown in FIG. 19, the conductive body 542 may be a sleeve having an opening at one end. The conductive pin 31 may be a single metal rod. By designing the depth of the sleeve and the length of the conductive pin 31, the closed end of the conductive body 542 abuts against the conductive pin 31 of the other photoelectric connector. The open end of the conductive body 542 is hole-shaft plugged with the conductive pin 31 of one photoelectric connector 9 to adjust the length fit to avoid hard contact.

Specifically, at the open end of the conductive body 542, the port portion may be provided with a guide bell mouth 5421 to prevent the conductive pin 31 from inserting defectively. The inner wall 5422 of the conductive body 542 is tightly attached to a side surface 315 of the conductive pin 31. At the closed end of the conductor 542, the tip plane 314 of the conductive pin 31 abuts against the bottom surface 5423 of the conductive body 542, thereby implementing the effective connection of the conductive pins 31 of the two photoelectric connectors 9.

Figure 21:
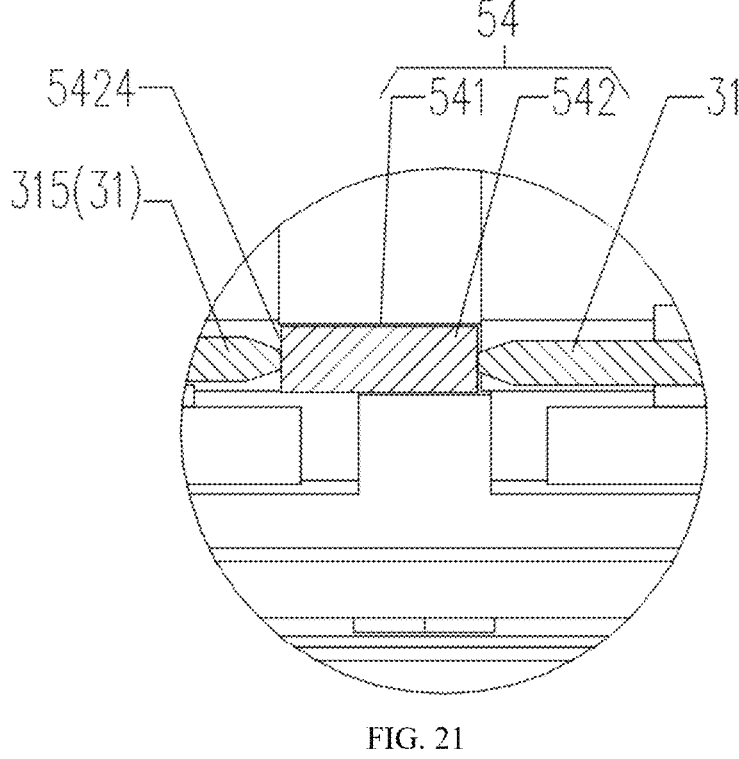
FIG. 21 is another embodiment of the C partial enlarged view of FIG. 16.

As shown in FIG. 21, the conductive body 542 may also be a metal conductive column having two end surfaces 5424. The two end surfaces 5424 of the conductive body 542 abut against the conductive pins 31 of each of the photoelectric connectors, respectively, so that the conductive pins 31 of the two photoelectric connectors are electrically connected.

Figure 20:
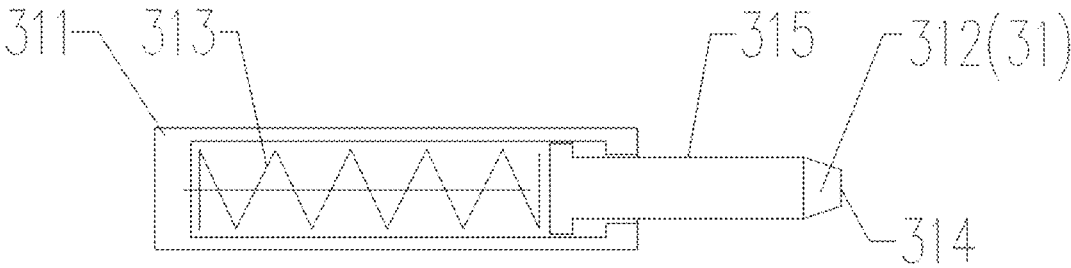
FIG. 20 is a schematic structural diagram of a conductive pin according to an embodiment of the disclosure.

In order to avoid damage caused by hard contact between the two conductive pins 31, in the above embodiments, if the conductive pins 31 are in conflict, the conductive pins 31 may be set as retractable components. As shown in FIG. 20, the conductive pin 31 includes a needle tube 311, a needle 312 inserted into the needle tube 311, and an elastic element 313 disposed in the needle tube 311. The needle tube 311 may be fixed on the tail handle 21, the housing 12, the rear housing 13, or the tail sleeve 14. The conductive pin 31 is configured so that the end face of the needle 312 is retractable relative to the housing assembly 1 to avoid hard contact during assembly. The cross section of the needle 312 is a circular or polygonal long column, which may be made of copper, steel, aluminum, etc. with good conductivity.

Various embodiments/implementations provided in the disclosure may be combined with each other without contradiction.

The foregoing is merely a preferred embodiment of the present disclosure, and is not used to limit the present disclosure, and for those skilled in the art, the present disclosure may have various modifications and changes. Any modification, equivalent replacement, improvement, etc. made within the spirit and principle of the present disclosure should be included within the protection scope of the present disclosure.

What is claimed is:

1. A photoelectric connector, wherein the photoelectric connector comprises:
   a housing assembly including a front-rear run-through receiving space;
   a light guide assembly including a tail handle, an insert core, and an optical fiber, wherein the insert core is disposed on one end of the tail handle; the tail handle is disposed in the receiving space; and the optical fiber is sequentially threaded into the tail handle and the insert core; and
   a conductive assembly including at least one conductive pin and a cable connected with the conductive pin;
   wherein the conductive pin and the insert core are located on the same side of the receiving space; and
   the conductive pin disposed on the tail handle,
   wherein the housing assembly comprises a housing, a rear sleeve and a tail sleeve, wherein the housing is nested with the rear sleeve to form the front-rear run-through receiving space, and the tail sleeve is nested at the end of the rear sleeve away from the housing.

2. The photoelectric connector according to claim 1, wherein the conductive pin at least partially extends out of the receiving space.

3. The photoelectric connector according to claim 1, wherein the tail handle comprises a handle body and a projection protruding outwards along a radial direction of the handle body, wherein the projection is provided with a first through hole, and one end of the conductive pin is inserted into the first through hole.

4. The photoelectric connector according to claim 1, wherein a wall surface of the receiving space is formed with an avoidance groove for avoiding the conductive pin.

5. The photoelectric connector according to claim 1, wherein the housing includes a housing body having a first via hole, and a side wall of the housing body formed with a first channel; the rear sleeve is a sleeve having a second via hole; the housing body is nested with the rear sleeve; and the first via hole is connected through the second via hole to form the receiving space;
   the tail sleeve is a sleeve with a third via hole, and a side wall of the tail sleeve is formed with a second channel;
   one end of the cable passes through the third via hole from one side of the tail sleeve away from the rear sleeve, then through the second channel to an outside of the tail sleeve, and then through the first channel into the receiving space to be connected to the conductive pin.

6. The photoelectric connector according to claim 5, wherein the first channel is a through hole or an open slot; and/or
   the second channel is a through hole or an open slot.

7. A photoelectric adapter, which is matched with a photoelectric connector, wherein the photoelectric connector comprises:

a housing assembly including a front-rear run-through receiving space;

a light guide assembly including a tail handle, an insert core, and an optical fiber, wherein the insert core is disposed on one end of the tail handle; the tail handle is disposed in the receiving space; and the optical fiber is sequentially threaded into the tail handle and the insert core; and a conductive assembly including at least one conductive pin and a cable connected with the conductive pin;

wherein the conductive pin and the insert core are located on the same side of the receiving space; and the conductive pin disposed on the tail handle, and wherein the photoelectric adapter includes a body, a support portion, a sleeve member, and a conductive portion;

the body is formed with at least one axial through passage;

the support portion is supported in the channel and divides the channel into two sub-channels, and the two sub-channels are respectively in plug-in fit with the housing assembly of the corresponding photoelectric connector;

the sleeve member is hollow and is disposed along the axial direction of the channel, and the sleeve member is disposed on the support portion and connected with the two sub-channels, and two ends of the sleeve member are respectively in plug-in fit with the insert core of the corresponding photoelectric connector; and the conductive portion is disposed on the support portion, and is configured to electrically connect the conductive pins of two photoelectric connectors.

8. The photoelectric adapter according to claim 7, wherein the conductive portion is an axial through hole, and two ends of the conductive portion are configured for insertion respective of the conductive pins of the two photoelectric connectors so that the conductive pins abut against the two ends of the conductive portion to implement electrical connection.

9. The photoelectric adapter according to claim 7, wherein the conductive portion includes an axial through guide hole and a conductive body disposed in the guide hole, wherein two sides of the conductive body are electrically connected with the conductive pins of the two photoelectric connectors, respectively.

10. The photoelectric adapter according to claim 9, wherein the electric conductor is a sleeve with an opening at one end plugged with the conductive pin of one photoelectric connector, and one closed end of the conductive body abuts against the conductive pin of another photoelectric connector.

11. The photoelectric adapter according to claim 10, wherein two end surfaces of the conductive body abut against the conductive pins of each of the photoelectric connectors, respectively.

12. The photoelectric connector according to claim 2, wherein the tail handle comprises a handle body and a projection protruding outwards along a radial direction of the handle body, wherein the projection is provided with a first through hole, and one end of the conductive pin is inserted into the first through hole.

13. The photoelectric connector according to claim 2, wherein a wall surface of the receiving space is formed with an avoidance groove for avoiding the conductive pin.

14. The photoelectric connector according to claim 2, wherein the housing includes a housing body having a first via hole, and a side wall of the housing body formed with a first channel; the rear sleeve is a sleeve having a second via hole; the housing body is nested with the rear sleeve; and the first via hole is connected through the second via hole to form the receiving space;

the tail sleeve is a sleeve with a third via hole, and a side wall of the tail sleeve is formed with a second channel;

one end of the cable passes through the third via hole from one side of the tail sleeve away from the rear sleeve, then through the second channel to an outside of the tail sleeve, and then through the first channel into the receiving space to be connected to the conductive pin.

15. The photoelectric connector according to claim 14, wherein the first channel is a through hole or an open slot; and/or the second channel is a through hole or an open slot.

\* \* \* \* \*